UNITED STATES PATENT OFFICE.

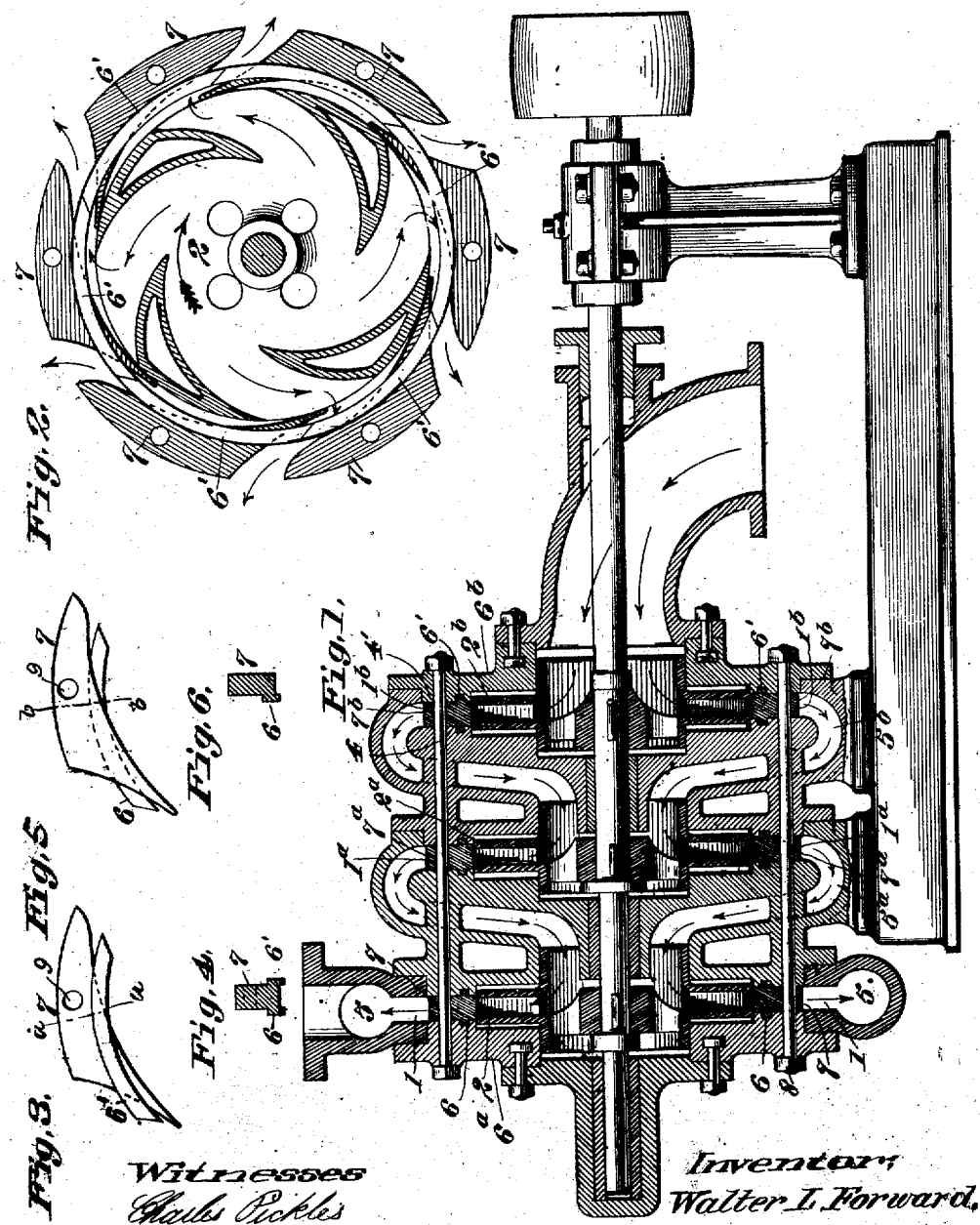

WALTER L. FORWARD, OF WEST BERKELEY, CALIFORNIA, ASSIGNOR TO BYRON JACKSON IRON WORKS, OF WEST BERKELEY, CALIFORNIA, A CORPORATION OF CALIFORNIA.

HIGH-PRESSURE TURBINE-PUMP.

963,539.      Specification of Letters Patent.    Patented July 5, 1910.

Application filed January 3, 1910. Serial No. 536,089.

*To all whom it may concern:*

Be it known that I, WALTER L. FORWARD, a citizen of the United States, residing at West Berkeley, in the county of Alameda and State of California, have invented new and useful Improvements in High-Pressure Turbine-Pumps, of which the following is a specification.

My invention relates more particularly to a method of securing the guide vanes placed in the throat surrounding the runner in a rotary or turbine pump, and to so form the said guide vanes that they may be securely fixed in place, conveniently finished, and separably removed in case of renewal or repair.

My invention consists of the parts and the construction and combination of parts as hereinafter more fully described and claimed, having reference to the accompanying drawings, in which—

Figure 1 is a vertical, longitudinal section of a three stage centrifugal pump. Fig. 2 is a detail view of guide vanes and runner. Fig. 3 is a detail view of the guide vanes. Fig. 4 is a section of same on line $a$—$a$ of Fig. 3. Fig. 5 is a detail view of modification of guide vane. Fig. 6 is a section on line $b$—$b$ of Fig. 5.

In a turbine pump with guide vanes, it has been found in practice that there is an intense vibration of the fluid issuing from the rim of the runner due to the fluid being divided by the arms or blades of the runner, and that it is necessary to secure the guide vanes surrounding the runner rigidly, to prevent the said guide vanes from having the slightest vibration which would cause excessive wear and breakage.

A further object is to so construct the guide vanes of a turbine pump that they may be separably and perfectly machined and in case of breakage of one or more of the said guide vanes they may be renewed without the loss of the whole set.

Referring now more specifically to the drawings, Fig. 1 shows a vertical longitudinal section of an ordinary form of a 3-stage turbine pump, showing the runners mounted on a single shaft, the said runners located in separate chambers, and fluid passages leading from the annular openings or throats 1—1$^a$—1$^b$ surrounding the runners 2—2$^a$—2$^b$ to the succeeding runners, and finally discharging into the discharge shell 5. It will be observed that the said annular openings or throats 1—1$^a$—1$^b$ are formed between the side walls 4—4' of the subjoined shells 5—5$^a$—5$^b$, and covers 6$^a$—6$^b$, and that counterbores or grooves are formed in the said side walls 4—4' near the smaller diameter, which receive the outwardly projecting securing segments 6—6' which are cast integral with, and are part of the guide vanes 7—7$^a$—7$^b$.

In Fig. 1, are shown the through bolts, 8, which securely bind the shells and covers together, these bolts also passing through the solid portions of the guide vanes 7—7$^a$—7$^b$.

Fig. 2 shows the guide vanes 7—7$^a$—7$^b$ as they would appear if placed in their regular order, showing the diagonally cut ends of the securing segments 6—6', the dotted lines showing the continuation of the guide vanes 7—7$^a$—7$^b$ between the said securing segments 6—6'.

Fig. 3 shows a single guide vane 7 with the bolt-hole 9 in the solid portion of the guide vane 7, and the securing segment 6—6'.

A section view taken at $a$—$a$ is shown in Fig. 4 showing the outwardly projecting securing segments 6—6' cast integral with, and part of the guide vane 7.

Fig. 5 shows a single guide vane 7 having a securing segment 6 on one side only, and Fig. 6 is a section of the guide vane 7 showing the securing segment 6 projecting from one side only, as my invention may be constructed with the securing segments 6 on one or both sides of the guide vanes and yet come within the scope of my invention.

Having thus described my invention, what I claim and desire to secure by Letters Patent is—

1. The combination in a turbine pump having a shaft and runner carried thereon, a housing and an annular opening exterior to the runner, of independent guide vanes forming fluid passages, said vanes each having projecting segments, means to removably secure said vanes in the annular opening, and counterbored channels with which the vane segments engage.

2. The combination in a turbine pump having a shaft and runner carried thereon, a housing and an annular opening exterior to the runner, of guide vanes forming fluid passages, said guide vanes having outwardly projecting segments, and means to removably secure said vanes in the annular opening.

3. The combination in a turbine pump having a shaft and runner carried thereon, a housing and an annular opening exterior to the runner, said opening having counterbores in the sides, of guide vanes located in the annular opening and having outwardly projecting segments fitting into the counterbores, and means to independently secure the segments in the annular opening.

4. The combination in a turbine pump having a shaft and runner carried thereon, a housing and an annular opening exterior to the runner, said opening having counterbores in the sides, of guide vanes located in the annular opening and having outwardly projecting segments fitting into the counterbores, and bolts to secure the vanes in the openings, said bolts passing through the solid portions of the vanes.

5. The combination in a turbine pump having a shaft, and a runner carried thereby, a housing and an annular channel exterior to the runner, of independent guide vanes located in said channel, one or more segments projecting from each vane, and counterbored channels with which the vane segments engage.

6. The combination in a turbine pump having a shaft, and a runner carried thereby, a housing and an annular channel exterior to the runner, of independent guide vanes located in said channel, one or more segments projecting from each vane, counterbored channels with which the vane segments engage, and bolts by which each vane is independently and removably secured.

7. The combination in a turbine pump having a shaft, and a runner carried thereby, a housing and an annular channel exterior to the runner, of independent guide vanes located in said channel, one or more segments projecting from each vane, counterbored channels with which the vane segments engage, and securing bolts passing through the shells, and the body of each guide vane.

8. A rotary pump consisting of a shell or casing inclosing an interior chamber, a runner or impeller of smaller diameter than the chamber, and revoluble therein, independent vanes located in the chamber exterior to the runner, each having transversely projecting segments and corresponding annular channels in the casing walls into which the vane segments extend.

9. A rotary pump including a shell or casing, a runner revoluble within the shell, independent tangential vanes surrounding the runner and having segments projecting from the sides, annular channels in the casing walls into which the segments extend, and bolts passing through the solid portions of the vanes and the casing.

10. Wedge-shaped curved guide vane for turbine pumps, having one or more securing segments extending from the sides of the vane, said vane having a bolt-hole through its solid portion.

In testimony whereof I have hereunto set my hand in the presence of two subscribing witnesses.

WALTER L. FORWARD.

Witnesses:
Wm. H. Carr,
Wm. D. Watson.